United States Patent [19]

Bayer et al.

[11] Patent Number: 5,202,987
[45] Date of Patent: Apr. 13, 1993

[54] HIGH FLOW-RATE SYNCHRONIZER/SCHEDULER APPARATUS AND METHOD FOR MULTIPROCESSORS

[76] Inventors: Nimrod Bayer, 7 Gordon Street, Givataim; Ran Ginosar, Nofit 104 (near Tivon), both of Israel

[21] Appl. No.: 641,250

[22] Filed: Jan. 15, 1991

[30] Foreign Application Priority Data

Feb. 1, 1990 [IL] Israel ..................................... 093239

[51] Int. Cl.$^5$ ........................................... G06F 15/16
[52] U.S. Cl. .............................. 395/650; 364/DIG. 1; 364/281.8; 364/230.3; 364/271.3; 364/228.3
[58] Field of Search ................. 364/DIG. 1; 395/650

[56] References Cited

U.S. PATENT DOCUMENTS

| | | | |
|---|---|---|---|
| 4,333,144 | 6/1982 | Whiteside et al. | 364/DIG. 1 |
| 4,590,555 | 5/1986 | Bourrez | 364/DIG. 1 |
| 4,779,194 | 10/1988 | Jennings et al. | 364/DIG. 1 |
| 4,954,945 | 9/1990 | Inoue | 364/DIG. 1 |
| 4,967,326 | 10/1990 | May | 366/DIG. 1 |
| 4,985,831 | 1/1991 | Dulong et al. | 364/DIG. 1 |

OTHER PUBLICATIONS

"The Effect of Operation Scheduling on the Performance of a Data Flow Computer" M. Gransky et al., IEEE Transactions on Computers, vol. C-36, No. 9, Sep. 1987, pp. 1019-1029.
"High-Performance Computer Architecture", H. S. Stone, Addison-Wesley Publishing Co., 1987, pp. 347-365.
"Execution of Parallel Loops On Parallel Processor Systems", C. D. Polychronopoulos et al., Proc. Int. Conf. on Parallel Processing, 1986, pp. 519-527.
"A Technique For Reducing Synchronization Overhead In Large Scale Multiprocessors", Z. Li et al, Proc. of the 12th Symp. on Computer Architecture, 1985, pp. 284-291.
"The Piecewise Data Flow Architecture: Architectural Concepts", J. E. Requa et al., IEEE Trans. on Computers, vol. C-32, No. 5, May 1983, pp. 425-438.
"A Case Study in the Application of a Tightly Coupled Multiprocessor to Scientific Computations", N. S. Ostlund et al., Parallel Computations, G. Rodrigue, editor, Academic Press, 1982, pp. 315-364.
"Synchronized and Asynchronous Parallel Algorithms For Multiprocessors", H. T. Kung, Algorithms and Complexity, Academic Press, 1976, pp. 153-200 (reprinted with permission by Department of Computer Science, Carnegie-Mellon University, Pittsburgh, Pa., pp. 428-463).
"A Survey of Synchronization Methods for Parallel Computers", A. Dinning, IEEE Computer, vol. 20, No. 19, Jan. 1987, pp. 100-109.
"Synchronization, Coherence, and Event Ordering in Multiprocessors", M. Dubois et al., IEEE Computer, vol. 21, No. 2, Feb. 1988, pp. 9-22.
"The NYU Ultracomputer—Designing an MIMD Shared Memory Parallel Computer", A. Gottlier, et al., IEEE Trans. on Computers, Feb. 1983, pp. 175-189 (reprinted with permission by the Courant Institute of Mathematical Sciences, New York University, New York as pp. 276-290).

(List continued on next page.)

*Primary Examiner*—Thomas M. Heckler
*Attorney, Agent, or Firm*—Morgan & Finnegan

[57] ABSTRACT

A high flow-rate synchronizer/scheduler apparatus for a mutiprocessor system during program run-time, comprises a connection matrix for monitoring and detecting computational tasks which are allowed for execution containing a task map and a network of nodes for distributing to the processors information or computational tasks detected to be enabled by the connection matrix. The network of nodes possesses the capability of decomposing information on a pack of allocated computational tasks into messages of finer sub-packs to be sent toward the processors, as well as the capability of unifying packs of information on termination of computational tasks into a more comprehensive pack. A method of performing the synchronization/scheduling in a multiprocessor system of this apparatus is also described.

10 Claims, 4 Drawing Sheets

OTHER PUBLICATIONS

"Cm*—A modular, multi-microprocessor", R. J. Swan, et al., AFIPS Conf. Proc., 1977 National Computer Conference, pp. 637-644.

"Architecture and Applications of the HEP Multiprocessor Computer System", B. J. Smith, Real Time Signal Processing IV, Proceedings of SPIE, Aug. 1981, pp. 241-248 (reprinted as pp. 231-238).

"The IBM Research Parallel Processor Prototype (RP3): Introduction and Architecture", G. F. Pfister et al., Proc. Int. Conf. on Parallel Processing, Aug. 1985, pp. 764-771.

"Cedar", D. Gajski et al., Report No. UIUCDCS-R-8-3-1123, Department of Computer Science, University of Illinois, Urbana, Feb. 1983, pp. 1-25 (reprinted as pp. 251-275).

"A Synchronization Scheme and Its Applications for Large Multiprocessor Systems," C. Q. Zhu, Proc. 4th Int. Conf. on Distributed Computing Systems, 1984, pp. 486-493.

"The Butterfly Parallel Processor", W. Crowther et al., Newsletter of the Computer Architecture Technical Committee (IEEE Computer Society), Sep./Dec. 1985, pp. 18-45.

"Efficient Synchronization Primitives for Large-Scale Cache-Coherent Multiprocessors", J. R. Goodman, Proc. of the Conf. on Architectural Support for Programming Languages and Operating Systems, ASPLOS-III, 1989, pp. 64-75.

"Guided Self-Scheduling: A Practical Scheduling Scheme for Parallel Supercomputers", C. D. Polychronopoulos et al., IEEE Trans. on Computers, vol. C-36, No. 12, Dec. 1987, pp. 1425-1439.

"A Controllable MIMD Architecture", S. F. Lundstrom et al., Proceedings of the 1980 International Conference on Parallel Processing, pp. 19-27 (reprinted by Burroughs Corporation, Paoli, Pa. as pp. 165-173).

"The Fuzzy Barrier: A Mechanism for High Speed Synchronization of Processors", R. Gupta, Proc. of the Conf. on Architectural Support for Programming Languages and Operating Systems, ASPLOS-III, 1989, pp. 54-63.

"A Hardware Task Scheduling Mechanism for Real-Time Multi-Microprocessor Architecture", A. D. Hurt et al., Proceedings of the 1982 Real-Time Systems Symposium, pp. 113-123.

"Combining Data Flow and Control Flow Computing", Computer Journal, vol. 25, No. 2, 1982, pp. 207-217.

"NP-Complete Scheduling Problems," J. D. Ullman, J. Comput. Syst. Sci., vol. 10, Jun. 1975, pp. 384-393.

"Computer and Job-Shop Scheduling and Theory", E. Coffman, Wiley Publishers, New York, 1976, p. 58.

"A Hardware-Synchronized/Scheduled Multiprocessor Model", submitted as a M. Sc. Thesis, EE Department, Technion, Israel Institute of Technology, Jan. 1989 (unpublished) pp. 83-92.

"Programming for Parallelism", A. H. Karp, IEEE Computer, vol. 20 No. 5, May 1987, pp. 43-57.

"Introduction to VLSI Systems", C. Mead et al., Addison-Wesley, 1980, chap. 7 pp. 218-254.

"Connectionist Architectures for Artificial Intelligence", S. E. Fahlman et al., IEEE Computer, vol. 20, No. 19, Jan. 1987, pp. 100-109.

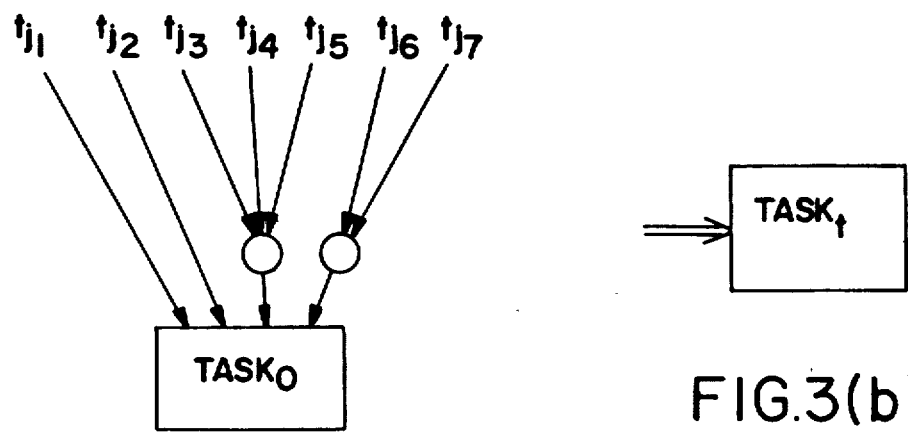
FIG.3(a)
FIG.3(b)
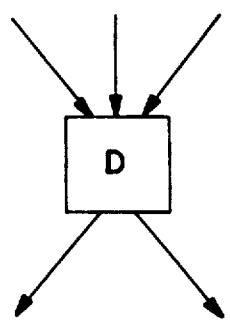
FIG.3(c)
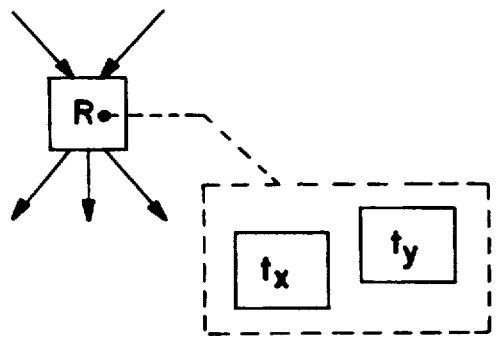
FIG.3(d)
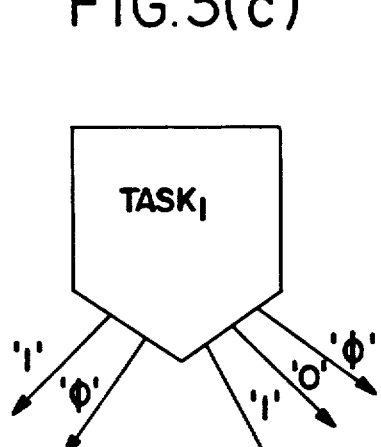
FIG.3(e)
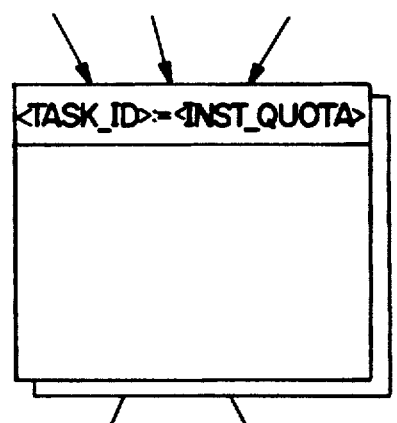
FIG.3(f)

HIGH FLOW-RATE SYNCHRONIZER/SCHEDULER APPARATUS AND METHOD FOR MULTIPROCESSORS

FIELD OF THE INVENTION

The present invention relates to an architectural solution to the problem of accomplishing efficient synchronization, scheduling and work allocation in multiprocessors.

BACKGROUND OF THE INVENTION

The coordination of multiple operations in shared memory multiprocessors often constitutes a substantial performance bottleneck. Process synchronization and scheduling are generally performed by software, and managed via shared memory. Execution of parallel programs on a shared-memory, speedup-oriented multiprocessor necessitates a means for synchronizing the activities of the individual processors. This necessity arises due to precedence constraints within algorithms: When one computation is dependent upon the result of other computations, it must not commence before they finish. In the general case, such constraints are projected onto an algorithm's parallel decomposition, and reflected as precedence relations among its execution threads.

Synchronization is only one aspect of a broad activity, which may be termed parallel operation coordination, whose other aspects are scheduling and work allocation. Scheduling is selecting an execution order for the operations of a program, out of a space of execution orders which are feasible under the given architecture and precedence constraints, as described in the paper entitled "The Effect of Operation Scheduling on the Performance of a Data Flow Computer," M. Gransky et al, IEEE Trans. on Computers, Vol. C-36 No. 9, September 1987, pp. 1019-1029. While scheduling deals with the point of view of the tasks to be computed, work allocation deals with the point of view of the processors which carry out the tasks. Thus, the distinction between scheduling an allocation is not clear-cut, and some researchers use these terms interchangeably. The decisive questions may be posed as follows: "which ready-to-run piece of work should be executed first ?" which is a matter of scheduling policy; questions of the sort "to which processor should a given piece of work be allocated ?" or "how much work should be allocated at once to a given processor ?", are considered to be a matter of allocation policy. Scheduling and allocation may be static, i.e. determined before program run-time.

In fully dynamic systems, all these coordination activities are not an inherent part of the actual computation, but are rather designed to support it. Since they consume computational resources, they are considered as overhead. Coordination or synchronization efficiency, refers to the efficiency of parallel operation coordination activity itself, excluding the indirect effects of scheduling policy.

The overall multiprocessor performance is influenced significantly by the efficiency of coordination, as described in the book entitled "High-Performance Computer Architecture", H. S. Stone, Addison-Wesley, 1987, and in the papers entitled "Execution of Parallel Loops on Parallel Processor Systems," C. D. Polychronopoulos et al, Proc. Int. Conf. on Parallel Processing, 1986, pp. 519-527: "A Technique for Reducing Synchronization Overhead in Large Scale Multiprocessors", Z. Li et al. Proc. of the 12th Symp. on Computer Architecture, 1985, pp. 284-291; "The Piecewise Data Flow Architecture: Architectural Concepts," J. E. Requa et al. IEEE Trans. on Computers, Vol. C-32 No. 5, May 1983, pp. 425-438; "A Case Study in the Application of a Tightly Coupled Multiprocessor to Scientific Computations," N. S. Ostlund et al, Parallel Computations, G. Rodrigue, editor, Academic Press, 1982, pp. 315-364; "Synchronized and Asynchronous Parallel Algorithms for Multiprocessors," H. T. Kung, Algorithms and Complexity, Academic Press, 1976, pp. 153-200; and "A Survey of Synchronization Methods for Prallel Computers," A Dinning, IEEE Computer, Vol. 20 No. 19, January 1987, pp. 100-109.

Inefficiencies in these processes are manifested in overhead-activity and overhead-idling. The former is the activity which is required, once a task has been computed, to obtain a new piece of productive work, while the latter is due to contention of synchronization resources, which are system-global by nature.

Overhead-idling is principally caused by insufficient synchronization rate capability. As noted in the text by H. S. Stone supra, this capability (expressed in MSYPS, Millions of Synchronizations Per Second) constitutes an independent architectural measure; in particular, it is not necessarily proportionate to the system's overall raw processing power, as expressed MIPS and MFLOPS. Decompositing a given algorithm into ever finer granularity levels will yield an ever increasing demand for synchronization rate, and an ever bigger ratio of overhead-activity to productive computation. Thus, at some level of granularity, synchronization may become a bottleneck, thereby practically limiting the exploitable level of parallelism. Consequently, it is desirable to search for means to increase the synchronization rate capability and to reduce the coordination overhead activity of multiprocessor systems.

Synchronization methods for multiprocessors were born out of mutual exclusion methods, prevalent in multiprogrammed uniprocessors. Still, synchronization is usually implemented around special synchronization data in main memory, as described in the paper entitled "Synchronization, Coherence, and Event Ordering in Multiprocessors," M. Dubois et al, IEEE Computer, Vol. 21 No. 2, February 1988, pp. 9-22. These synchronization data are either stand-alone (e.g. locks and semaphores), or attached to regular data objects (such as presence bits). A variety of synchronization primitives, such as Test & Set or Fetch & Add. serve to establish access to synchronization variables and to manipulate them, as described in the paper entitled "The NYU Ultracomputer—Designing an MIMD shared Memory Parallel Processor," A. Gottlieb et al. IEEE Trans. on Computers, February 1983, pp. 175-89. The implementation of these primitives is based on some special hardware support, whether rudimentary or massive. Yet the essential levels of parallel operation coordination are implemented in software. Some examples of prominent commercial and research multiprocessors which are included in this framework are described in the following papers: "Cm*—A modular multi-microprocessor," R. J. Swan et al, AFIPS Conf. Proc., 1977 National Computer Conference, pp. 637-644; "Architecture and Applications of the HEP Multiprocessor Computer System," B. J. Smith, Real Time Signal Processing IV, Proceedings of SPIE, August 1981, pp. 241-248; "The IMB RP3 Introduction and Architecture," G. F. Pfister et al. Proc. Int. Conf. on Parallel Processing, August 1985, pp. 764–771; "Cedar", D. Gajski et al, Report No. UIUCDCS-R-83-1123. Department of Computer Science, University of Illinois, Urbana, February 1983, pp. 1-25; "Synchronization Scheme and its Applications for Large Multiprocessor Systems," C. Q. Zhu Proc. 4th Int. Conf. on Distributed Computing Systems, 1984, pp. 486-493; and "The Butterfly Parallel Processor," W. Crowther et al. Newsletter of the Computer Architecture Technical Committee (IEEE Computer Society), September/December 1985, pp. 18-45. Within this framework, efforts are aimed at improving synchronization efficiency were routed to the following directions: Development of enhanced hardware support for synchronization primitives (most notably - NYU Ultracomputer's combining network, as described in the paper by Gottlieb, supra.); development of more powerful synchronization primitives as described in the paper by C. Q. Zhu et al supra, and the paper by J. R. Goodman entitled "Efficient Synchronization Primitives for Large-Scale Cache-Coherent Multiprocessors," Proc. of the Conf. on Architectural Support for Programming Languages and Operating Systems, ASPLOS-III, 1989, pp. 64–75; development of inherently asynchronous parallel algorithms, as described in the paper by H. T. Kung supra; and development of various techniques for synchronization minimization, as described in the paper by Z. Li et al, and in the paper entitled "Guided Self-Scheduling: A Practical Scheduling Scheme for Parallel Supercomputers," C. D. Polychronopoulos et al, IEEE Trans. on Computers, Vol. C-36 No. 12, December 1987, pp. 1425-1439.

A recent survey of synchronization methods contained in the paper by Dinning supra, describes in detail the synchronization mechanisms of seven machines. While giving a classification for prevalent synchronization methods, the paper by Dinning supra confirms the central and basic role of protocols for synchronized access to shared data in all these methods (except in "puristic" message passing).

Synchronization mechanisms which exceed the framework described above, while promoting the role of hardware, have been proposed by various researchers. Some of these proposals are aimed at hardware implementations of barrier synchronization or synchronized wait, as described in the papers entitled "A Controllable MIMD Architecture," S. F. Lundstrom et al, Proceedings of the 1980 International Conference on Parallel Processing, pp. 19-27 and "The Fuzzy Barrier: A Mechanism for High speed Synchronization of Processors," R. Gupta, Proc. of the Conf. on Architectural Support for Programming Languages and Operating Systems, ASPLOS-III, 1989, pp. 54–63. A more general hardware mechanism, which is aimed at arbitrary parallelism patterns, is based on routing of control tokens, but is oriented towards essentially static work allocation, is proposed in the paper entitled "A Hardware Task Scheduling Mechanism for Real-Time Multi-Microprocessor Architecture," A. D. Hurt et al, Proceedings of the 1982 Real-Time Systems Symposium, pp. 113-123. A centralized synchronization/scheduling facility, targeted at arbitrary parallelism patterns and at dynamic allocation and scheduling, was argued for in the paper by D. Gajski supra, but no specific architecture was proposed.

Therefore, it would be desirable to provide a global synchronization/scheduling unit which is capable of dynamic allocation and scheduling in a multiprocessor system.

SUMMARY OF THE INVENTION

Accordingly, it is a principal object of the present invention to overcome the above-mentioned disadvantages of the prior art, and provide apparatus for accomplishing a high synchronization/scheduling rate, adequate for massively parallel multiprocessors.

It is another object of the invention to provided the synchronization/scheduling apparatus with the capability of fast detection of events where dormant computational tasks become allowed for execution.

It is still a further object of the invention to provide a global synchronization/scheduling subsystem which offloads synchronization/scheduling-related overhead activity from the processors.

In accordance with a preferred embodiment of the present invention, there is provided a hardware synchronization/scheduling apparatus for performing synchronization/scheduling in a multiprocessor system by controlling, during program run-time, a process of monitoring and detecting which computational tasks are allowed for execution and allocating computational tasks to processors, the tasks being represented by instructions and data accessible to the processors via instruction and data storage hardware, said synchronization/scheduling apparatus comprising:

means for monitoring and detecting which computational tasks are allowed for execution, said monitoring-/detecting means containing a task map describing the precedence relations among the computational tasks of the program; and communication/distribution means for distributing, to the processors, information on computational tasks detected by said monitoring/detecting means to be allowed for execution and for forwarding, to said monitoring/detecting means, information on termination of execution of computational tasks at the processors, Said communication/distribution means comprising a network of nodes processing both the capability of decomposing information on a pack of allocated computational tasks into messages of finer sub-packs of allocated computational tasks to be sent toward the processors, and possessing the capability of unifying packs of information on termination of computational tasks into a more comprehensive pack, to be sent to said means for monitoring/detecting of allowed computational tasks.

In the preferred embodiment, the proposed architecture adds a synchronization/scheduling subsystem to the multiprocessor subsystem. This consists of a central unit and an active distribution network controlling the multiple processors. The synchronization/scheduling subsystem is programmed with the complete synchronization and scheduling information for the executed parallel algorithm.

The synchronization/scheduling subsystem comprises a task map which contains dependencies between tasks to be performed by the processors. The code of the tasks is loaded in the shared memory space, whereas the topology of the task map is held by the synchronizer/scheduler. The latter uses the task map for allocating tasks to the processors. While doing so, it continuously monitors the employment state of the processors, and makes allocations dynamically and on the basis of processor availability. A task is allocated by signalling its identification information across the link between the synchronizer/scheduler and the designated processor. Further parameters, or data to be processed by the task, may be acquired from the shared memory.

When allocated a task, a processor is caused to restart, with the first instruction fetch address determined by the task's identity. The processor then proceeds in executing instructions fetched from memory, until encountering an instruction signifying the end of the task. The processor then enters a halted state, exporting an indication of its new state to the synchronizer/scheduler. This indication, when received by the synchronizer/scheduler, serves a twofold function: First, the processor is marked free and ready for another allocation. Secondly, the event of the current task's termination is internally marked, and may cause the enabling of other tasks which depend on the current one. A task is said to be enabled when it is recognized by the system to be allowed for execution. The enabling of a dependent task takes place if all its other input dependencies have already been activated in a similar manner. (OR relations between input dependencies are also possible, and discussed further herein with regard to the architecture's underlying programming model).

In addition to a task map, the synchronizer/scheduler is supplied with the system configuration data. This includes such details as the number of processors, the capabilities of each processor (if processors are not a-priori identical), etc.

Given a set of enabled tasks, as well as processor availability data, the synchronizer/scheduler then performs scheduling of those tasks. Any non-random scheduling policy must rely upon some heuristics: Even when task execution times are known in advance, finding an optimal schedule for a program represented as a dependency graph is an NP-complete problem. Most scheduling heuristics are bases on the critical path method, and thereby belong to the class of list scheduling policies; i.e., policies that rely on a list of fixed task priorities. List scheduling can be supported by the inventive scheme described herein, by embedding task priorities in the task map load-module submitted to the synchronizer/scheduler. Whenever an allocation takes place, the allocated tasks are those which have highest priorities amongst the current selection of enabled tasks.

The general architectural concepts described so far may be implemented in multiple alternative ways. The processors may range from minute processing elements to large scientific processors. They are not limited to any specific type, and are not confined to the von-Neumann model. They can also be compound processing units. The architecture may also be applied to non-homogeneous systems. The shared memory may consist of physically shared storage, possibly accessed through an interconnection network, or be distributed over the processors, as long as common memory space is preserved, at least in part.

Other features and advantages of the invention will become apparent from the following drawings and description.

BRIEF DESCRIPTION OF THE DRAWINGS

For a better understanding of the invention with regard to the embodiments thereof, reference is made to the accompanying drawings in which like numerals designate corresponding elements or sections throughout, and in which:

FIGS. 3a-f show graphical notations for programming features associated with a programming model useful in constructing a task map for multiprocessor control;

DETAILED DESCRIPTION OF A PREFERRED EMBODIMENT

Reference is now made to FIGS. 1-7, showing various aspects of the proposed architecture of a synchronization/scheduling subsystem for a multiprocessor. The proposed synchronizer/scheduler subsystem consists of a central scheduling unit (CSU) and an active distribution network controlling the multiple processors. The proposed subsystem is programmed with the synchronization and scheduling information for the executed parallel algorithm. The next section contains a discussion of the general system architecture, its performance and its goals. The architecture's underlying programming model is then described. Following this, the general architecture of the synchronizer/scheduler subsystem is discussed, and finally a detailed discussion of the architecture of the central unit of the subsystem is presented.

(I)

SYSTEM ARCHITECTURE AND EXPECTED PERFORMANCE

A program intended for execution on a multiprocessor which incorporates the synchronization/scheduling scheme described herein, must be represented by a dependency graph. The dependency graph is called the program's task map; Its nodes represent tasks, and its (directed) edges represent task interdependencies. Tasks are granules of computation, of any desired size (e.g. they may embrace any number of machine instructions). The graph may contain cycles. The task map is submitted to the hardware, and used during run-time. This dependency-graph-driven mode of computation, attributed by non-elementary granularity, is referred to in the paper to Gajski et al supra as macro dataflow. Yet according to a terminology introduced by Treleaven et al, in the paper entitled "Combining Data Flow and Control Flow Computing," Computer Journal, Vol. 25 No. 2, 1982, pp. 207-217, it may rather be referred to as multi-threaded control flow. That is because the data communication mechanism (namely, the shared memory) is distinct here from the synchronization/scheduling mechanism, and dependency arcs do not necessarily "carry data" but denote control flow.

There is a distribution between a task, which is a quantum of program code and a task map object, and a task instantiation, which is an execution process derived from a task. The reason for this seemingly subtle distinction will be made clear in a later section. Until then, for the sake of simplicity, this distinction is ignored.

Figure 1:
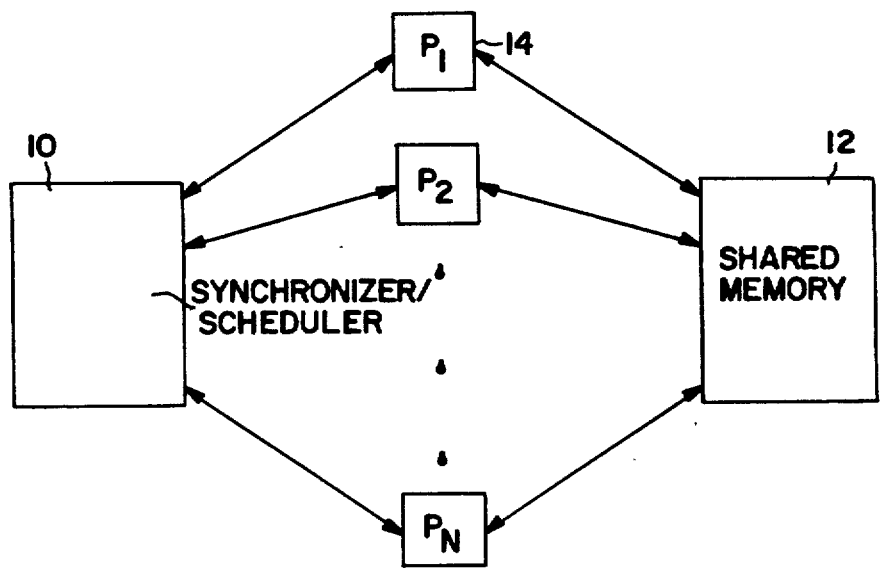
FIG. 1 shows a multiprocessor system architecture featuring a synchronizer/scheduler apparatus constructed and operated in accordance with the principles of the present invention.

The multiprocessor architecture is illustrated in FIG. 1. As can be seen, the parallel operation coordination subsystem (synchronizer/scheduler 10) forms an appendage to a conventional configuration of a shared-memory 12 and processors 14.

The synchronization/scheduling subsystem comprises a task map which contains dependencies between tasks to be performed by the processors 14. The code of the tasks is loaded in memory, whereas the topology of the task map is held by the synchronizer/scheduler 10. The latter uses the task map for allocating tasks to processors 14. While doing so, it continuously monitors the processors 14 employment state, and makes allocations dynamically and on the basis of processors availability. A task is allocated by signalling its identification information across the link 16 between the synchronizer/scheduler and the designated processor. Further parameters, or data to be processed by the task, are acquired from the shared memory 12 via link 18.

When allocated a task, a processor 14 is caused to restart, with the first instruction fetch address determined by the task's identity. The processor 14 then proceeds in executing instructions fetched from main memory, until encountering an instruction signifying the end of the task. The processor 14 then enters a halted state, exporting an indication of its new state to synchronizer/scheduler 10. This indication, when received by synchronizer/scheduler 10, serves a twofold function: First, the processor 14 is marked free and ready for another allocation. Secondly, the event of the current task's termination is internally marked, and may cause the enabling of other tasks which depend on the current one. The enabling of a dependent task takes place if all its other input dependencies have already been activated in a similar manner. (OR relations between input dependencies are also possible, and discussed further herein with regard to the architecture's underlying programming model).

In addition to a task map, synchronizer/scheduler 10 is supplied with the system configuration data. This includes such details as the number of processors, the capabilities of each processor (if the processors are not a-priori identical), etc.

Given a set of enabled tasks, as well as processor availability data, synchronizer/scheduler 10 then performs scheduling of those tasks. Any non-random scheduling policy must rely upon some heuristics: Even when task execution times are known in advance, finding an optimal schedule for a program represented as a dependency graph is an NP-complete problem, as described in the paper entitled "NP-Complete Scheduling Problems," J. D. Ullman, J. Comput. Syst. Sci., Vol. 10, June 1975, pp. 384-393. Most scheduling heuristics are bases on the critical path method, and thereby belong to the class of list scheduling policies; i.e., policies that rely on a list of fixed task priorities as described in the paper by Gransky et al supra, and the text entitled "Computer and Job-Shop Scheduling and Theory," E. Coffman, Wiley Publishers, New York, 1976. List scheduling can be supported by the inventive scheme described herein, by embedding task priorities in the task map load-module submitted to the synchronizer/scheduler. Whenever an allocation takes place, the allocated tasks are those which have highest priorities amongst the current selection of enabled tasks.

The general architectural concepts described so far may be implemented in multiple alternative ways. The processors may range from minute processing elements to large scientific processors. They are not limited to any specific type, and are not confined to the von-Neumann model. They can also be compound processing units. The architecture may also be applied to non-homogeneous systems. The shared memory may consist of physically shared storage, possibly accessed through an interconnection network, or be distributed over the processors, as long as the common memory space is preserved, at least in part.

Performance Bounds

An immediate merit of the herein described scheme is that any parallel operation coordination overhead is offloaded from the processors. This activity is shifted to the special purpose hardware, and is performed in parallel with productive computation. This carries the potential for a significant shrink in overhead per synchronization point. Another merit is the optimal load balancing, attained due to the fact that allocations are performed dynamically, on a global basis, and are driven by processors availability. Optimal load balancing means that no situation can occur where enabled computational work becomes committed to a specific portion of the system which cannot accomodate it at that moment, while a processor not belonging to that portion is idling. It is clear that the conditions specified above ensure optimal load balancing by definition.

Synchronization rate is measured here as the total flow-rate of task initiation (namely, synchronization flow-rate) across the synchronizer/scheduler's ports. If the synchronizer/scheduler provides too low a synchronization flow-rate, a synchronization bottleneck may result. In considering the question of whether the synchronizer/scheduler's flow-rate capability constitutes a bottleneck in comparison to the requirements of the parallel program, the graph of FIG. 2 may be used.

The horizontal axis depicts the given maximal flow-rate of synchronizer/scheduler apparatus 10, scaled in terms of a measure which is called the canonical flow-rate, or fc, which is a parameter of the program being executed, and is the only such parameter involved in the analysis. It is defined as the average flow-rate developed when the program is run on a system containing an infinite number of processors and an ideal synchronizer/scheduler 10 apparatus, one having infinite flow-rae capability. An equivalent definition would be the ratio between the total number of task executions that must occur, and the length of the critical path on the program's task map. In the ideal execution process, the momentary flow-rate may sharply deviate from the average fc.

Figure 2:
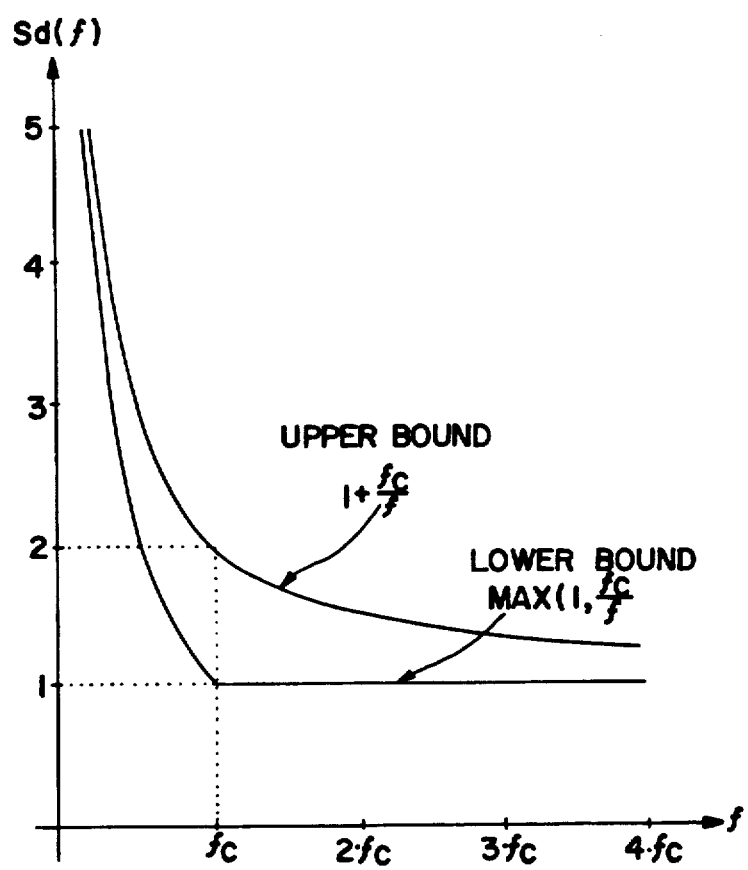
FIG. 2 is a graph illustrating bounds on the overall slowdown in program execution as a function of the available synchronization/scheduling rate capability.

The vertical axis of the graph of FIG. 2 depicts the overall slowdown in program execution, incurred by the given limitation on the synchronizer/scheduler's flow-rate, still under the assumption that the number of processors is unlimited. This assumption established a "worst-case" condition; its relaxation implies a potential decrease in the demand for flow-rate. A lower bound and an upper bound on slowdown are depicted. The lower bound reflects the fact that the time needed to complete the execution for a program can be not shorter than the minimal time needed for allocating all of its tasks. The lower bound is valid for any synchronization/scheduling mechanism whatsoever, whether based upon hardware or upon software. The upper bound is valid only under the assumption that the processors are relieved from any synchronization/scheduling-related overhead activity, as happens in this invention. The upper bound can be proven mathematically, based on the assumption that the flow-rate is only semi-finite, in the sense of having only one direction of limitation. The mathematical proof and rationale for this assumption are included in the material by N. Bayer entitled, "A Hardware-Synchronized/Scheduled Multiprocessor Model," submitted as a M. Sc. Thesis, EE Department, Technion, Israel Institute of Technology, January 1989 (as yet unpublished).

In order to sustain high flow-rate, it is also important to attain low enabling latency. This parameter reflects the time which elapses from the termination of the last task which prohibits the enabling of another task, until the latter can be allocated. Low enabling latency is desirable in order to allow efficient parallelism even in the more difficult and challenging cases, when the program's degree of parallelism is roughly the same as the number of processors, i.e. when there is no large reservoir of enabled tasks.

(II)

THE UNDERLYING PROGRAMMING MODEL

The programming model is the collection of rules and options serving for the construction of task maps, which is directly supported by the hardware. A task map coded according to this programming model will closely correspond to the load-module submitted to the synchronizer/scheduler. Preparation of the ultimate load-module will not include any essential transformation of the program.

This layer may serve as the basis for the definition of higher layers. Tools such as compilers and macro-expanders can be developed, which accept more powerful and abstract software constructs and translate them into task maps of the kind directly supported by the hardware.

Consolidation of the programming model includes software aspect related considerations, associated with an assessment of its computational power vs. the hardware investment needed. In the following description, the details of the programming model for the high flow-rate synchronizer/scheduler architecture are presented by review of the programming features which are illustrated by graphic notations shown in FIG. 3.

FIG. 3a shows the AND/OR relations between task input dependencies, with the standard task input dependency mechanism implementing a product-of-sums logic. Arrows entering a task symbol denote AND related dependencies, in accordance with the common notation convention for dependency graphs. Arrows approaching a task symbol via a circle sign denote OR related dependencies.

FIG. 3b shows pre-enabled task notation, with each program task being initialized as enable or non-enabled. Those initialized as enable are called pre-enable, and must be specifically declared so.

FIG. 3c shows dummy (or degenerated) tasks, noted as D-tasks, which when enabled, are not subjected to allocation; instead they are immediately declared as terminated, internally to the synchronizer/scheduler. D-tasks serve to express non-standard input dependency schemes and to manipulate dependency structures.

FIG. 3d shows reset tasks, noted as R-tasks which, similar to D-tasks, are also treated internally within the synchronizer/scheduler. However, an R-task does have an execution body: It rests all input dependencies of the tasks governed by it to a non-active state. It is useful for purging of "control tokens."

FIG. 3e shows conditioning tasks, which is the mechanism underlying global conditioning (task-local conditioning is implemented using the processor's branching instructions). The global conditioning mechanism is based upon a scalar boolean value, named termination condition (t_cond), which is returned to the synchronizer/scheduler upon the termination of each task. When a task begins, its t_cond is automatically initialized to a "1" value. The task is allowed access to the t_cond as a variable, and rests it to "0".

If a task is denoted $t_o$, each output dependency of $t_o$ may be of type "$\phi$", "0" or "1". Dependencies of types "0" and "1" are activated upon termination of $t_o$ only in conjunction with the appropriate t_cond value. A task having at least one non-"$\phi$" output dependency is termed a conditioning task, and must be explicitly declared so. The "$\phi$" signs are omitted in the graphic notation from output dependencies not belonging to conditioning tasks.

FIG. 3f shows duplicable tasks, which constitute a mechanism for supporting a particular form of dynamic process generation. Let <task_id> be a duplicate task. The enabling of <task_id> generates <inst_quota> instantiations pending for allocation. Execution of these instantiations is in SPMD style, as described in the paper "Programming for Parallelism", A. H. Karp, IEEE Computer, Vol. 20 No. 5, May 1987, pp. 43-57. All processors receiving an instantiation of <task_id> execute the same code, by under the modification of the instance number transmitted by the synchronizer/scheduler. The event of <task_id>'s termination is identified with the termination of its last instantiation. The number of instantiations <inst_quota> is initialized at compile-time, but may be updated at run-time by the processors. For this purpose, the internal register within the synchronizer/scheduler dedicated to <task_id> is subject to external access (write only), as if it were a global memory cell. A duplicate task cannot be a conditioning one.

The introduction of duplicable tasks necessitates the following refinements in terminology: the term "computational task" refers to pieces of computational work in general. However, in the context of this embodiment, computational tasks performed by the processor are referred to a "task instantiations" or briefly, instantiations, while the term "task" is reserved for the task-met objects themselves.

(III)

GENERAL ARCHITECTURE OF THE SYNCHRONIZER/SCHEDULER

Figure 4:
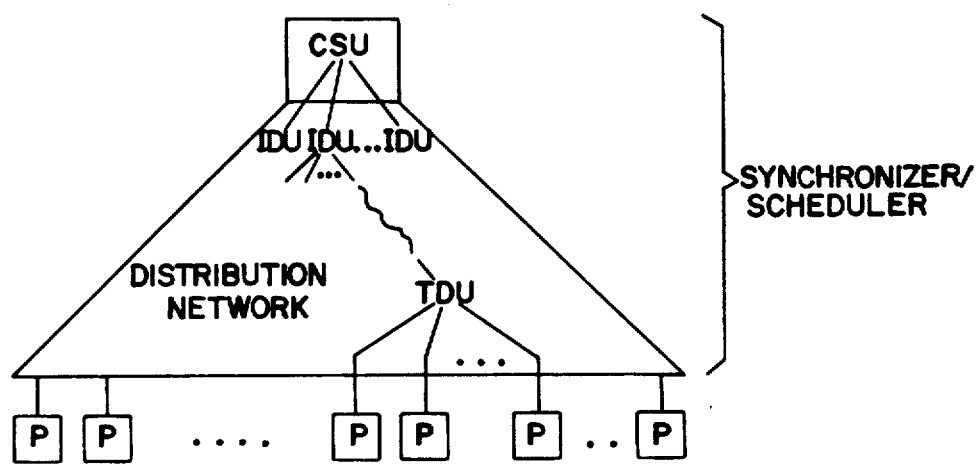
FIG. 4 is a schematic diagram of the synchronizer/scheduler apparatus architecture, featuring a central synchronization/scheduling unit and a distribution network.
Figure 5:
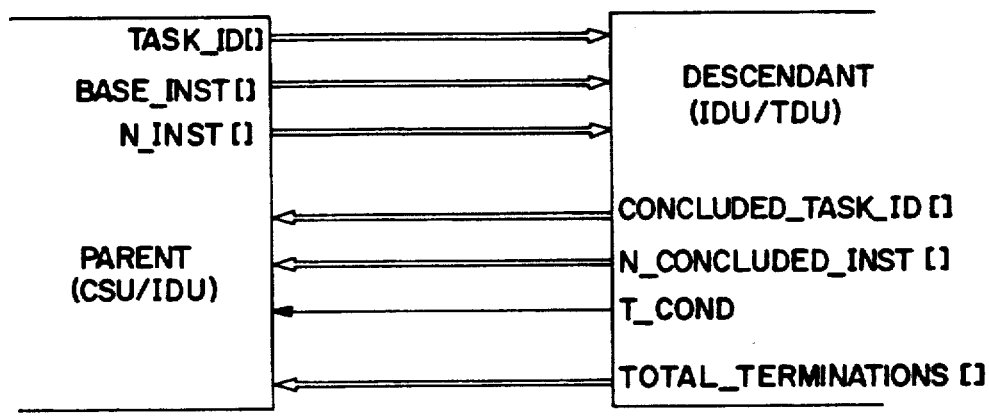
FIG. 5 is a schematic diagram of an interface through which the central synchronization/scheduling unit communicates with the distribution network of FIG. 4, and through which nodes of the distribution network communicate with each other.
Figure 6:
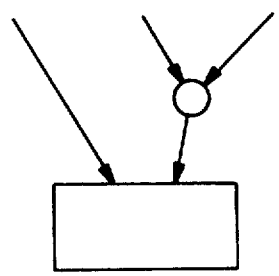
FIG. 6 is a schematic diagram of an example standard input dependency structure.

FIG. 4 illustrates the synchronizer/scheduler apparatus architecture. It is divided into two modules: A central synchronization/scheduling unit (CSU) and a distribution network. The distribution network mediates between the CSU, which constitutes the heart of the synchronizer/scheduler, and the processors. Its function is not the mere passive data transfer, but as further described herein, it creates an effect of amplifying the synchronizer/scheduler apparatus 10 flow-rate, in comparison with the flow-rate of the CSU alone. As this distribution network shares some common features with combining networks for shared memory access as described in the paper to Gottlieb et al supra, they will compared at the end of this section.

While the internal implementation of the CSU constitutes the theme of the next section, this section discusses the architecture and operation of the synchronizer/scheduler as a whole.

The proposed structure is founded upon the inclusion of duplicable tasks in the programming model. The existence of duplicable tasks in a program helps make the total number of task enablings lower than the total number of task-instantiations allocated to processors (the enabling of a duplicable task is considered a single enabling). Thus, the average rate of task enablings, denoted $f_e$, is liable to be smaller than the flow-rate of allocating task-instantiations to processors, denoted $f_a$. The ratio $f_r = f_a/f_e$ is equal to the average number of instantiations per task (the average calculation includes also the regular tasks, which release exactly one instantiation per enabling, but does not include D-tasks and R-tasks). The factor $f_r$ which is a property of the program in combination with its input, is likely to reach orders of magnitude of tens, hundreds, or even more, as indicated by benchmark examples. Examples: instantiation quotas of duplicate tasks correspond to the sizes of blocks within the complete matrix; in particle-system simulation programs, the instantiation quotas of duplicable tasks may correspond to the number of interaction/maintaining particle pairs.

The interface between the distribution network and the processors carries individual allocation and termination messages, whereas the interface between the CSU and the distribution network carries allocation packs and termination packs. A pack contains one instantiation or more out of the collection of instantiations released by a single task-enabling. If the pack contains all the instantiations which were released, it is called a complete pack; otherwise it is called a partial pack. The instantiation indices belonging to an allocation pack must form a continuous sequence. The coding of packs employ a certain form of compression, such that the coding format employs a fixed number of bits: The task's identity is always coded; in an allocation pack the sequence of indices is also coded, e.g. as a pair, incorporating the first index and the sequence length. In a termination pack, the instantiation indices have no importance, and only their quantity is coded. For the purpose of discussing communications flow-rates, and due to this manner of coding, packs and individual messages will be counted according to the same measuring-rod.

The task map is concentrated in the CSU, which monitors the enabling of tasks. Allocation packs sent by the CSU are decomposed during their passage through the distribution network, and delivered to the processors as individual instantiations. The opposite operation, termed herein merge, is performed on termination messages. In this way, the communications flow-rate between the processors and distribution network may be amplified in comparison to the flow-rate of communications between the distribution network and the CSU. Namely, $f_{csu} < f_a$ where $f_{csu}$ denotes the total communications flow-rate across the CSU interfaces.

It should be noted that $f_{csu}$ is not always the same as $f_e$. Consider operating conditions where the collection of processors functions as a sink, i.e. it is willing to absorb any instantiation of any enabled task immediately, and there is a large reservoir of enabled tasks which is steadily reproduced. Under such a situation, the CSU sends and receives complete packs exclusively, and therefore its communications flow-rate is congruent to the enabling rate, namely $f_e = f_{csu}$, and the condition $f_a = f_r \times f_{csu\ max}$ holds. Under different operating conditions, the CSU may send and receive partial packs, or its flow-rate capacity may not be fully utilized.

Structure of the distribution network and types of interfaces

The distribution network is modular, as it consists of basic building blocks from which a desired configuration may be assembled. It is also possible to introduce local modifications and extensions without total dismantling and reassembly. As shown in FIG. 4, the building blocks are termed distribution units and are of two kinds: Terminal distribution units (TDU's) and Intermediate Distribution units (IDU's). The distribution network has a forest topology, complemented by the CSU into a tree, with the CSU at its root. It is reasonable to assemble balanced or almost balanced tree configurations, although any other tree may be assembled as well. The tree leaves are TDU's, and the processors attach to them; the internal nodes are IDU's. An extended tree is defined as one having leaves which are the processors themselves. Let v be a non-leaf node of the extended tree. The number of ports through which descendant nodes can be attached to v is designated as v's fan out. All interfaces on individual ports are of one of the following two types:

$$[parent = CSU/IDU] - [descedant = IDU/TDU] \quad (1)$$

$$[parent = TDU] - [descendant = P] \quad (2)$$

The major difference between interface types is that (1) is intended for transferring packs, whereas (2) is intended for transferring messages on individual or terminated instantiations. All units of the same kind constitute identical exemplars. Also, all interfaces of the same type are identical in every respect and in particular in the communications capacity.

Organization of the Configuration and Processor Employment Data

In contrast to the task map, the configuration data are distributed across the whole of synchronizer/scheduler apparatus 10. Each synchronizer/scheduler unit keeps the summation of configuration data pertaining to each sub-tree connected to any of its descendant ports. The information concerning current processor employment is also distributed in the same manner. For example, in a homogeneous system, the total number of disengaged processors belonging to a certain sub-tree is maintained, instead of separate information for each processor. For a TDU, a "Sub-tree" is always identical to a single processor. The update of processor employment data is performed in a distributed fashion: Each unit updates its own data, according to the amount of allocations and terminations passing through it.

Let v be a distribution unit. The configuration and processor employment data for the sub-tree with v at its root is maintained by v's parent. Therefore, it is guaranteed that the allocations v receives are within the limits of the current sinking ability of that sub-tree. According to the configuration and processor employment data maintained by v itself, it must divide these allocations among its descendants. Suppose there are multiple division possibilities, and the system is symmetrical. The allocations may then be randomly divided.

However, the simplest way for dividing the allocations is according to fixed port priorities. Determination of the descendant port priorities at each unit induces global priorities for the external ports of the synchronizer/scheduler. These global priorities can be exploited for establishing balanced allocation when each processor is built to accomodate up to two contexts, and is connected to the synchronizer/scheduler via two separate ports. Every processor is then assigned a high priority and a low priority port. This outline may be generalized also for more than two ports. The motivation for supporting multiple contexts within a processor is concerned with countering memory latency, as discussed in the reference by N. Bayer, supra.

Management of Termination Information

The termination messages generated by the processors serve two distinct functions:
a) Enabling of new tasks dependent on the terminated ones.
b) Monitoring processor employment state.

These two functions induce conflicting considerations regarding the policy of termination packs forwarding through the distribution network:

For serving function (a) well, fragment packs need not be hurriedly sent towards the root of the tree. Since the termination of a duplicable task is defined as the termination of all of its instantiations, such fragments may be held up at the distribution network nodes in order to achieve maximal unification. This unification is indispensable for the reduction of the amount of information traffic at levels closer to the root of the tree.

Contrarily, function (b) calls for a policy of transferring every termination message without any delay. This can be illustrated by considering an extreme case: Suppose that there are 256 processors, which have received exactly 256 instantiations of the task $t_x$ concurrently. While 255 instantiations require T computation time, one instantiation requires $100 \times T$ computation time. In waiting for a full unification of the termination pack, 255 processors are disutilized for duration of $99*T$.

The proposed solution for this problem is a split into two separate mechanisms, each of them handling one of the functions. A distribution unit v receives two kinds of data from its descendants:

(1) Termination packs, as described above (not to be exploited as an information regarding processors disengagement).
(2) Messages expressing qualities of processors which have entered a halted state (disregarding the tasks conducted by them).

Under the implementation presented in the following section, each of these kinds of data is transferred on its own dedicated wires.

Upon receiving a datum of kind (1) relating to a task $t_x$, v accumulates it into its count of $t_x$'s terminated instantiations; Yet nothing is sent to v's parent, unless this datum completes the count to the total sum of $t_x$'s allocations previously passed through v. When the termination data regarding $t_x$ is sent to v's parent, the above-mentioned counts are reset, so the maximal value of these counts if bounded by the maximal amount of instantiations a task is allowed to have for one enabling.

Hence the number of termination packs submitted by v to its parent until a certain moment, is less than or equal to the number of allocation packs received by v until that moment. (An inequality relation may hold not only due to unfinished instantiations, but also due to coverage of several allocation packs by a single termination pack). Thus, the mean demand for communications traffic of termination packs at every point within the network is equal or less than the traffic of allocation packs.

Contrarily, data of type (2) arriving at v from several descendants concurrently are merged into a unified datum, which is sent to v's parent immediately (in addition to using them for internal update at v). The possibility of always performing such a merge stems from the way employment data are organized. Due to this regular merging possibility, any delays associated with waiting for available communication paths (for type (2) data) are eliminated. The event of a processor belonging to v's sub-tree becoming available, will be reflected at the employment data maintained by v within a delay proportional to the length of the path between the processor and v.

Characterizing Parameters

The parameters characterizing a specific synchronizer/scheduler can now be summarized:
Loading Capacity:
The maximal size of a task map which can be loaded. This parameter is expressed in terms of quantity of tasks, and/or in terms of quantity of dependency connections.
Reduced Maximal Flow-Rate:
Maximal synchronization flow-rate which can be attained for programs which do not include duplicable tasks. This parameter actually expresses the CSU flow-rate, and is independent of the assembled configuration. The reduced maximal flow-rate is equal to a type (1) interface's communications capacity, times the fan-out of the CSU.
Extended Maximal Flow Rate:
Maximal synchronization flow-rate which can be attained for any program. This parameter depends on the assembled configuration, and does not depend on the CSU's fan-out. The extended maximal flow-rate is equal to a type (2) interface's communications capacity, times the total number of TDU's descendant ports.
Enabling Latency:
Duration from the moment a processor $P_i$ announces the termination of an instantiation belonging to a task $t_i$ until a processor $P_j$ receives an instantiation of a task $t_j$ depending on $t_i$, provided:
a) The termination and allocation messages involved are not delayed due to contention on communication paths.
b) No other terminations are needed to trigger $t_j$'s enabling. The synchronizer/scheduler's enabling latency is composed of the CSU's enabling latency, plus a component proportional to the depth of the distribution network tree. This second component depends upon fan-out values, and upon the assembled configuration. When the tree is balanced, this component is logarithmic in the number of synchronizer/scheduler ports. Note that the enabling latency may be more complex than a fixed, single-valued parameter.
Allocation Advances:

Quotas for over-allocations of task instantiations, which the CSU or every IDU separately (but excluding the TDU's) are programmed to allocate their descendants, beyond the calculation of free processors. Allocation advances are aimed at compensating against the delays associated with the flow of processor disengagement information through the network. Implementation of allocation advances obliges that the distribution units have a capability of storing buffered allocation packs. This is a set of programmable parameters. There is presented herein the principal possibility of using allocation advances, but not the computation of their optimal values. Although allocations to individual processors are still made on the basis of availability, the optimal load balancing, as defined previously regarding System Architecture may be disrupted, and this should be assessed quantitatively. When the program's degree of parallelism is sufficiently higher than the number of processors, so there is a sufficient reservoir of enabled tasks, allocation advances can be set so as to saturate the distribution network with ready-to-execute task instantiations. Under such a situation, a processor is allocated a new task instantiation immediately as it terminates the previous one, avoiding any overhead-idling whatsoever.

The fact that the task map is totally concentrated in the CSU facilitates the possibility of allocating any task instantiation to any processor, and establishes the capability of dynamic regulation of allocations (distribution of the task map is possible in hierarchical extensions of the general scheme discussed here). However, because of this same fact, the CSU induces a certain extent of centralization in the system; from here stems the importance of amplifying its flow-rate through the distribution network.

Assuming the CSU cost is not dominant, then relatively small configurations, assembled around a given CSU module while rendering its flow-rate superfluous, can still be cost-effective.

The configuration and processor employment data maintained for each descendant port by a TDU, are reduced in comparison to the data maintained by an IDU. In addition, a type (2) interface is reduced in comparison to a type (1) interface. Therefore, for an identical cost, a TDU's fan-out is anticipated to be higher than an IDU's fan-out. An even higher fan-out can be attained for a TDU through a variation of the basic structure, based on another consideration: Execution of a task instantiation by a processor lasts a certain duration, and time intervals do exist during which no communications between a given processor and the TDU takes place. On the account of this unused communications capacity, a group of processors can be attached to a single port in a bus configuration.

Under the architecture described thus far, all external parts of the synchronizer/scheduler can be driven simultaneously, hence (assuming that every processor has its private port) the extended maximal flow-rate immanently matches the maximal sinking capability of the processors. As far as flow-rates are concerned (namely, disregarding latencies), the only possible source for a bottleneck is the reduced maximal flow-rate; that is, the CSU flow-rate. The bounds on slowdown due to a limited flow-rate presented earlier regarding FIG. 2 apply to the CSU flow-rate in the same way they apply to the flow-rate of the synchronizer/scheduler as a whole. The only difference is that in the former case the total number of enablings is taken into the calculation of the canonical flow-rate, whereas in the latter case the total number of released instantiations is taken into the analysis.

Comparison with the Combining Network

The conjunctive feature of both the distribution network and the combining network for memory access proposed in the paper by Gottlieb et al supra, is the decomposition and unification of information performed at every network node. The differences between the networks stem from the fact that they are destined to attach to inherently different units, in that end which is not attached to the processors.

There is a difference in topology, which is also a difference in complexity: The combining network has been proposed in an N×N Omega topology, typically consisting of 2×2 elements; the distribution network has an N×1 tree topology, consisting of (fan-out)×1 elements.

In order to isolate further differences, consider a combining network for memory access which is based on a tree topology as well. (This is possible when all synchronization data are concentrated in a single memory module). In the distribution network the active agent is situated at the root of the tree (the CSU), and the passive agent is situated at the leaves (the processors). The opposite is true regarding the combining network: The active agent is situated at the leaves (the processors), and the passive agent is situated at the root (the memory module). This fact generates differences in the mechanisms of information flow.

Information transmitted from the root of the tree in the combining network is destined for pre-determined addresses (addresses of specific processors). Contrarily, in the distribution network addresses are established during the passage through the network, in a distributed process that has to do with load regulation. In the direction from the leaves to the root, the merging of information in the combining network is performed on an occasional basis: A merge takes place only if two mergeable items occur at the same node at the same time. In the distribution network, however, there are rules to enforce the merge of items, regardless of arrival times and at the level as far as possible from the root of the tree.

The following duality exists between the two networks: In the combining network, decomposition of data is dictated by their merge (the subject for decomposition are responses returning from memory); In contrast, in the distribution network the merge of data is dictated by their decomposition (the subject for merge are termination messages returning from the processors). However, the mechanism controlling the sending of information on the direction from the root to the leaves in the distribution network, seems to be essentially different than the mechanism controlling the sending of information on the direction from the leaves to the root in the combining network.

(IV)

STRUCTURE OF THE CENTRAL SYNCHRONIZATION/SCHEDULING UNIT

The internal architecture of the CSU is now presented. As noted in the previous section, this unit is the only possible source for a performance limitation as far as flow-rates are concerned. Therefore, it is the most important among the synchronizer/scheduler units. The CSU holds the task map, and is responsible for the function of detecting/monitoring of task enablings. In addition, the CSU keeps its own configuration and availability data, and performs a distribution function, in an essentially similar manner to a distribution network - node. Hence, the CSU is the most complex of all synchronizer/scheduler units, and apart from playing its own singular role, it plays a representative role with regard to the embodiment of the whole apparatus. The design space is rich with possibilities and an optimal design may be achieved with additional work. The design version presented herein achieves some desired properties related with flow-rate and enabling latency, and represents a certain archetypical outline; Yet simplicity considerations play a substantial role in this version. Throughout the course of presentation, potential improvements, as well as alternative design options, are pointed out.

In order to eliminate any ambiguity, the abstraction levels that are dealt with in the context of presenting the CSU architecture, reach the level of logic design.

The timing discipline that appears to be most appropriate for the synchronizer/scheduler (as well as for other parts of a multiprocessor, at certain levels of the structural hierarchy) is self-timing, as described by C. L. Seitz in the text entitled "Introduction to VLSI Systems", C. Mead et al, Addison-Wesley, 1980, chap. 7 pp. 218-254. The reasons for this are: a) the difficulties associated with spreading of clock signals throughout a large, space-distributed system; b) preventing excessive mutual coercion of operational rates among units, in order to increase utilizations and decrease delays. Nevertheless, the design presented herein is based on the discipline of synchronous timing with a single clock, due to its simplicity. Under this timing discipline each signal line assumes a single valid value on each clock cycle, which is the value that stabilizes towards the end of the cycle.

In the following design version, the system is assumed to be totally symmetrical, so that any processor may receive any task, and without any preferability differences between processors.

Definition of Type (1) Interface

The CSU communicates with the distribution network through type (1) interfaces (as denoted in the previous section). The lines that take part in a type (1) interface are graphically summarized in FIG. 5, and the duties of the various lines are specified in the following table.

TABLE I

| Line/Line Group | Description |
|---|---|
| TASK_ID[ ] | Identification number of the task to which the current allocation pack pertains. (A mapping from this identification number to the address of the task's code in main memory is accomplished through fast tables coupled to the processors. The address is not transmitted directly, in order to make economical usage of lines). |
| BASE_INST[ ] | Number of the least instantiation among the sequence of instance numbers belonging to the current allocation pack. (If the identification number TASK_ID[ ] pertains to a task which has not been declared as duplicable, then the contents of the BASE_INST lines are meaningless for the current clock cycle). |
| N_INST[ ] | Amount of instantiations contained in the current allocation pack. (If no allocation pack is transferred on the current clock cycle, a zero value appears on this line group, and random values appear on the TASK_ID[ ] and BASE_INST[ ] line groups. In case that the task is non-duplicable, as in the case that the pack contains a single instantiation of a duplicable task, a value of 1 appears on the N_INST[ ] lines). |
| CONCLUDED_TASK_ID[ ] | Identification number of the task to which the current termination pack pertains. |
| N_CONCLUDED_INST[ ] | Amount of instantiations contained in the current termination pack. (If no termination pack is transferred on the current clock cycle, a zero value appears on this line group, and random values appear on the CONCLUDED_TASK_ID[ ] and T_COND[ ] lines. In case that the task is non-duplicable, as in the case that the pack contains a termination message pertaining to a single instantiation of a duplicable task, a value of 1 appears on the N_CONCLUDED_INST[ ] lines). |
| T_COND | Termination condition value pertaining to the current termination message. (If the task's identification number, CONCLUDED_TASK_ID[ ], does not belong to a conditioning task — this line has a meaningless contents on the current clock cycle. In particular, the T_COND is meaningless when the contents of the N_CONCLUDED_INST[ ] lines are greater than 1). |
| TOTAL_TERMINATIONS[ ] | A lump sum of task instantiations terminated at the sub-tree which is hung on this port. (This datum serves for monitoring processor employment state. An IDU must add up all TOTAL_TERMINATIONS[ ] values received from descendants, and send the sum to its parent on the next clock cycle; that is, the sum must be latched. However, an acceleration can be gained by avoiding the latching at some of the free levels). |

General Characteristics

In the current CSU design version, a high flow-rate and low enabling latency is preferred to high loading capacity. (Benchmark examples indicate that a loading capacity of the order of several tens of tasks is at the edge of acceptability; a duplicable task is considered as a single task for the sake of capacity calculation).

The internal representation of a task map within the CSU in this version is not through memory cells, but rather through a programmable topology of connections (logical "short circuits") between lines. This implementation approach may be entitled as connectionist approach, due to its affinity to connectionist architectures, as described in the paper entitled "Connectionist Architectures for Artificial Intelligence", S. E. Fahlman et al, IEEE Computer, Vol. 20 No. 19, Man. 1987, pp. 100–109. Yet another implementation approach may rely on associative memory: The memory will be organized in a way that each program dependency will be allocated a memory word, where the identification number of the task to whom it is an output dependency will serve as an access key, and the identification number of the task to whom it's an input dependency will serve as the datum to be fetched.

In the current version, the CSU does not contain a central controller designed on the basis of a state diagram, and there is no division into a control unit and a data path. The architecture is founded upon wide parallelism amongst a broad collection of simple elements. The following parameters are now defined:

$\lambda_1$ = the CSU's fan-out. $\lambda_1$ equals the maximal amount of allocation packs (and termination packs) that can be transferred by the CSU on a single clock cycle.

$\lambda_2$ = maximal amount of distinct TASK_ID values belonging to duplicable tasks which can appear on the CSU interfaces on a single clock cycle ($\lambda_2 \leq \lambda_1$).

$\lambda_3$ = maximal amount of non-duplicable tasks which can be allocated by the CSU on a single clock cycle ($\lambda_3 \leq \lambda_1$).

This version's underlying fundamental outline allows any combination of $\lambda_1$, $\lambda_2$ and $\lambda_3$. The concrete design presented here embodies $\lambda_1 = 4$, $\lambda_2 = 2$, and $\lambda_3 = 4$.

An approximate form of list scheduling is supported: On every clock cycle the $\lambda_2$ (at the outside) most prior duplicable tasks are selected, and also, separately, the $\lambda_3$ (at the outside) most prior non-duplicable tasks. This collection of $\lambda_2 + \lambda_3$ tasks (at the outside) is also subordinated to a priority setup, according to which $\lambda_1$ (at the outside) allocation packs are produced. In the concrete design presented here, $\lambda_2 + \lambda_3 = 6$ holds, and the scale of 6 priorities is as follows: The upper two priorities are granted to the two most prior non-duplicable tasks; then comes the most prior duplicable task; then the remaining two non-duplicable tasks, and eventually the remaining duplicable task. This is an example, but any other priority setup might be chosen. The policy in allocating a duplicable task in this version is to allocate maximum of its instantiations, and therefore up to $\lambda_1$ packs pertaining to the same duplicable task may be generated on a single clock cycle.

The tasks' priorities are mapped into their internal addresses within the CSU, and these are identified with the TASK_ID values taking part in transactions between the CSU and the outside world. In this version, the most significant bit (msb) of the TASK_ID distinguishes a task which has been declared as duplicable from a task which has not been declared so. Among two tasks having the same most significant bit, the one whose other TASK_ID bits determine a higher numerical value is the more prior.

The loading capacity is given in the general outline represented by this version as a set of several parameters:

A) Separate values for the capacities of duplicable tasks, of conditioning tasks, of regular (simple) tasks, and of D-tasks/R-tasks. (The capacities of duplicable and conditioning tasks can be exploited for regular tasks also).

B) The available standard dependency structures, corresponding to various sections of the task capacity. In the concrete design presented here, all tasks of all kinds have the standard input dependency structure depicted in FIG. 6. Also, in this design every task may be governed by one R-task at most.

Arbitrary dependency constructs can be created by partial utilization of standard structures on the one hand, and by usage of D-tasks on the other hand. In the embodiment of the central synchronization/scheduling unit (CSU) described, any desired standard input dependency structure can be supported.

Enabling latency specifications of the CSU

Let $t_x \rightarrow t_y$ be a dependency, forming the last input dependency to prohibit the enabling of $t_y$ at certain execution circumstances. Suppose that under these circumstances there is no delay in $t_y$'s allocation (or in the allocation of its first pack) due to unavailability of a free interface or free processors. Let i be the clock cycle whereon $t_x$'s termination message (or $t_x$'s last termination pack) has appeared. Then the clock cycle wheren $t_y$ will be allocated by the CSU (or its first allocation pack will be exported) is given by the following table:

TABLE II

| $t_y/t_x$ | non-duplicable | duplicable |
|---|---|---|
| non-duplicable | i + 1 | i + 2 |
| duplicable | i + 2 | i + 3 |

There is room for improvement of this version by introducing more intensive pipelining. This has been avoided to preserve simplicity considerations. Introduction of more intensive pipelining may facilitate for raising the clock frequency, that is to say raising the flow-rate, but may increase the enabling latency in terms of clock cycles.

Detailed Structural Description

Figure 7:
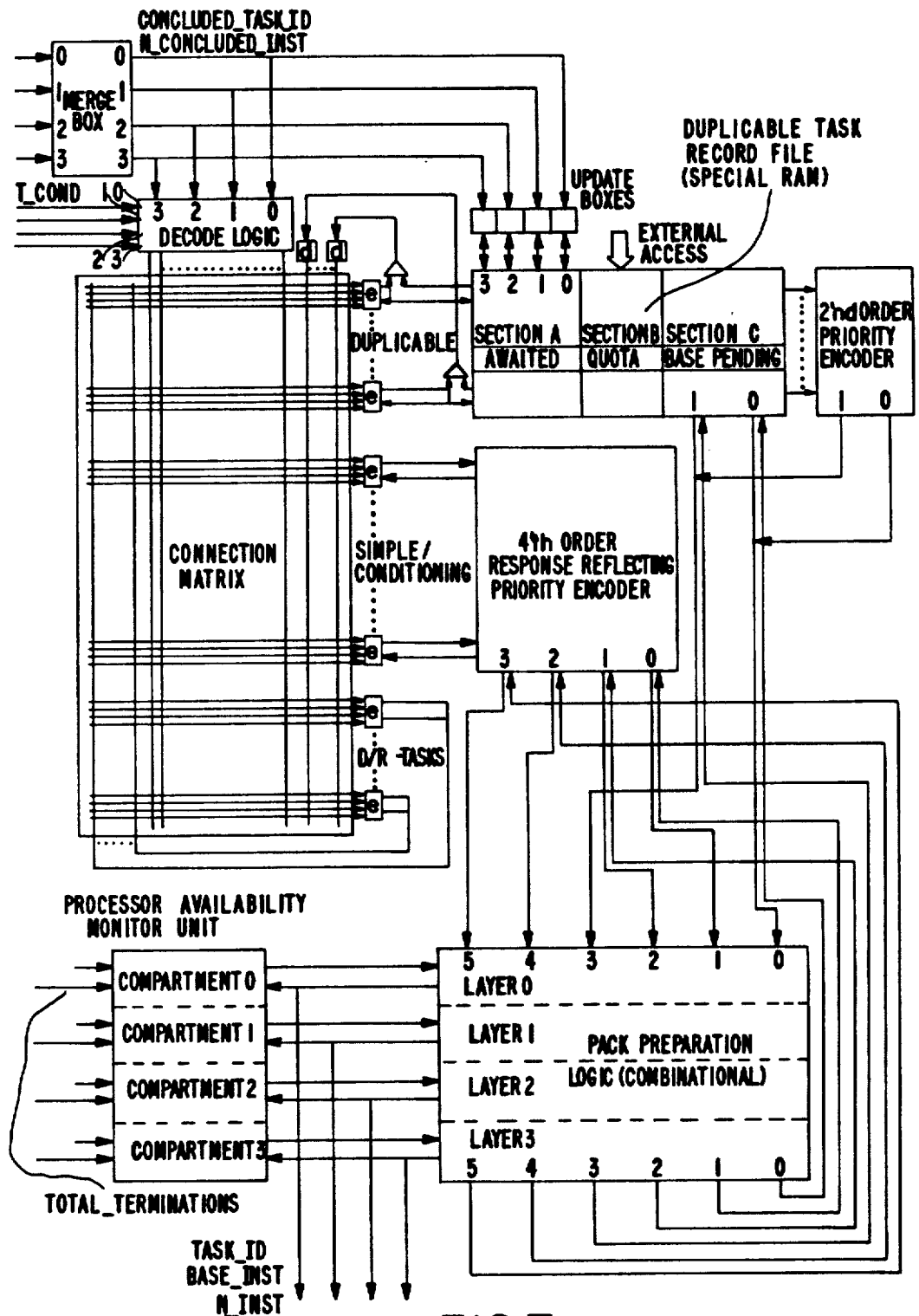
FIG. 7 is a schematic diagram architecture of a preferred embodiment of the central synchronization/scheduling unit of the invention.

The main drawing of the CSU design is given in FIG. 7. Some of these functional modules are considered to be general building blocks. Still others are specific CSU modules, which functionality is described in here, while their internal structures are illustrated in the appendix. The bold lines in FIG. 7 depict line groups or clusters of line groups, while the regular lines in the figure depict scalar (single bit) signal lines. In order to avoid overloading, signal names are not indicated on the drawing, apart from the names of the external lines which belong to interface number 0. The names can be inferred from the verbal descriptions.

The main drawing does not depict the mechanisms serving at task map load-time, but only the mechanisms serving during run-time. Also, the clock signal lines, entering all modules which do not constitute combinational logic, are omitted. Apart from the interfaces between the CSU and the distribution network, there is an additional external interface of the CSU, through which this unit is deemed as a memory module (write only). This interface serves the update of duplicate tasks instantiation quotas during run-time. The interface is shown in the drawing, but the hardware mechanisms associated with it are not detailed.

The connection matrix and the array of enabling cells (e-cells) constitute the heart of the CSU. Loading of a task map involves editing the connections in the matrix. The matrix columns are maped onto TASK_ID's that appear on the external interfaces, and so are the enabling cells. Therefore the determination of the TASK_ID's of the program tasks (following priority considerations) creates a mapping between them and enabling cells and connection matrix columns. A column of the connection matrix is stimulated (driven to logical "1" for one cycle exactly) following the termination of the corresponding task. Therefore, to a column which is mapped to some task $t_x$, there will be connected rows belong to enabling cells which are mapped to tasks that depend on $t_x$. For a given enabling cell, the row to be connected is selected according to the particular dependency pattern.

The detection of an event where a task becomes allowed for execution, namely, the enabling of a task, is manifested in setting (turning on) the enabling cell which is mapped to it; namely, in the entering of the cell into a state wherein its Q output is driven to a logical "1".

If an enabling cell belongs to the group which is intended for mapping to D-tasks/R-tasks, its setting causes the stimulation of the R input of that same cell, as well as the stimulation of the connection matrix column mapped to that same task. That is to say, all the output dependencies are activated, and the cell itself is reset on the successive clock cycle. Reset of dependencies, defined when the cell serves an R-task, also takes place on the successive clock cycle, due to stimulation of r type rows connected to that column. (The following constraint is obeyed; Any task depending on an R-task must not be allocated before the reset of dependencies is completed).

The Q outputs of enabling cells intended for mapping to simple/conditioning tasks are connected to the X inputs of the 4'th order response reflecting priority encoder. In this way the four most prior non-duplicable tasks (which are made for allocation, that is—are not D-tasks/R-tasks) are selected on each clock cycle. The TASK_ID value (apart from the most significant bit) that will be output when the task is allocated, is identical to the index of the X input fo the priority encoder to which the enabling cell is connected. The enabling cell remains in an "on" state, and the task remains pending for allocation, as long as the proper $ACK_{out}$ output of the priority encoder is not driven to logical "1". In the generation of this signal the pack preparation logic is involved, and it appears on the same clock cycle whereon the task is allocated.

In the allocation of duplicable tasks the duplicable task record file is involved. This module is essentially a special RAM. The setting of an enabling cell which belongs to the group intended for mapping to duplicable tasks, causes a certain initialization within the RAM, and the cell itself is reset immediately on the successive clock cycle. The dropping signal on the Q line may be identified by the synchronous differentiation cell (d-cell) attached to it via the OR gate, and thereby a stimulation of the connection matrix column which is mapped to that task may be evoked. This process takes place only if the task's instantiation quota is zero, so the task must be executed as a D-task. Otherwise, the RAM asserts the other input of the OR gate, starting on the clock cycle whereon the enabling cell turns off. A dropping signal at the input of the synchronous differentiator will appear in this case only upon the termination of executing the task's instantiations.

The number of words in the special RAM equals the number of enabling cells intended for mapping to duplicable tasks. As happens with the enabling cells, each RAM word is mapped to a specific task, and this is the task whose $TASK_{13}$ ID (apart from the most significant bit) is identical to the address of the RAM word.

Each RAM word is divided into three sections, A, B and C, each of them having a separate external access. Another division of each RAM word is into four fields; AWAITED, QUOTA, BASE and PENDING. (The names of the fields reflect their functions, which are explained below). The AWAITED and QUOTA fields are congruent to the A and B sections (respectively), whereas the BASE and PENDING fields, together comprising the C section, create a certain structural partitioning inside it.

The unconventionality of the RAM is reflected, first of all, in multiple access: The C section has a double access, and the A section has a quadratic access. (The operating conditions of the RAM within the overall CSU design, ensure that two concurrent accesses never apply to the same address). Secondly, the RAM performs an initialization operation, apart from read and write operations. The initialization operation involves substitution of a field's contents into other fields, and it is this operation that unifies the sections into a whole hardware module. Thirdly, the RAM incorporates groups of control and status lines (SUBS, NZ(AWAITED) and NZ(PENDING)) such that each address has its own dedicated line. (The SUBS lines are those that are driven by the e-cells; the NZ lines are the scalar lines going out of the RAM).

Whenever an address in the A or C section is accessed, the current content is read through DOUT lines, and a new content is written through DIN lines—both occur on the same clock cycle. The access must be qualified by the proper ENABLE line. All output signals of the RAM stabilize during the first phase of the clock cycle (when the clock is high), and are latched during the second phase of the clock cycle. Write and update operations take place on the second phase of the clock cycle.

The functions of the various fields are now described: The QUOTA field maintains the instantiation quota for the next enabling of the task. The access to this field (write only) is external to the CSU, and performed as a main memory access. The PENDING field maintains the amount of instantiations that are still pending for allocation for the current enabling. The BASE field maintains the index of the least pending instantiation. (All the instantiations that have an index lower than the BASE have already been allocated, and all those that have an index equal to or greater than the BASE have not yet been allocated). The AWAITED field maintains the amount of instantiations belonging to the current enabling (already allocated or pending) that have not been yet reported as terminated.

The initialization operation is individual to each address, and is operated upon some address i on a clock cycle whereon $SUBS_i = "1"$. The executed initialization is:

$$PENDING_i = QUOTA_i$$

-continued $$AWAITED_i = QUOTA_i$$

$$BASE_i = 1$$

(The result of asserting $SUBS_i$ on a clock cycle whereon an access to the address i at one of the RAM sections A or C takes place, is undefined. Such a coincidence cannot occur during the execution of an orderly program. An orderly program is defined as a program that satisfies the following requirement, for any legal input and regardless of the parameters of the architecture (number of processors, scheduling policy, etc.): A task would not be re-enabled, unless its execution triggered by the previous enabling has been terminated. Any program may artificially be forced to be orderly, by adjoining a pre-enabled D-task to every task, while defining a cyclic interpendence between them.)

The status signals generated by the RAM are of the sort $NZ(PENDING_i)$ and $NZ(AWAITED_i)$. The boolean scalar function $NZ(<field>)$ (NZ=Non-Zero) is defined as the OR function of all field's bits.

The two most prior duplicable tasks that do not have instantiations pending for allocation, are identified by the 2'nd order priority encoder through the NZ(PENDING) lines. The values appearing on the Y outputs of the priority encoder are the identification numbers (apart from the most significant bit) of these two tasks, which are also their RAM addresses. The Y outputs are fed back to the ADDRESS lines of section C, and in this way the BASE and PENDING values of the two tasks are also extracted (on the DOUT lines). The ENABLE inputs of section C, which serve for qualifying this access, are connected to the REQ outputs of the priority encoder.

The data concerning the four most prior non-duplicable tasks, and two most prior duplicable tasks, are received at the six input ports of the pack preparation (combinational) logic. Four of the ports are pre-destined for non-duplicable tasks, and the other two for duplicable tasks. The indices of the ports reflect their priority (the highest index designates the highest priority). An ID value (generated as a Y value by the proper priority encoder), as well as a VALID bit (generated as a REQ bit by that priority encoder) are received for each of the six tasks. The most significant bit of the TASK_ID is concatenated to the ID while the task is allocated: A "0" for a duplicable task, a "1" for a non-duplicable task. For the duplicable tasks (ports 3 and 0), BASE and PENDING values are also received.

The allocation pack preparation logic comprises four cascaded layers. Each one of them is in charge of a particular external interface. Each layer submit to its successor an output which has the same format as the input it receives from its predecessor. A layer locates the most prior port i such that VALID i="1", and tries to make an allocation for the task whose data are received on that port. The fulfillment of the allocation is conditioned upon the availability of free processors in the sub-tree hung on the interface of which the layer is in charge; the number of available processors is transmitted by the processors availability monitor unit through the proper AVPROC line group. if i ∈ {5,4,2,1} (the task is non-duplicable), the single instantiation of the task is allocated provided that AVPROC≠0. Otherwise (the task is duplicable), an instantiation pack of the size min {AVPROC, N} is allocated.

The ID data pass through all layers without being subject to any transformation. The data which may be altered between one layer to the next are the VALID bits, and also the N and BASE for ports 3 and 0. The data concerning tasks which are not selected for allocation at the current layer pass through it untouched. If the allocated task has been received on any of the ports 5, 4, 2 or 1 (the task is non-duplicable), the VALID bit to be transmitted to the next layer is turned off. Otherwise (the task is duplicable), the layer detracts the allocated amount from N, and increments the BASE by the same amount. If the new N equals to zero, the layer also turns off the VALID bit. In this way each layer receives the residues left by the layers above it.

The residues from the last layer are exploited for updating the enabling cells and the RAM: From the ports 5,4,2 and 1, boolean residues are received (the VALID bits), and they are used as logical complements of the $ACK_{in}$ values submitted to the response reflecting priority encoder. The enabling cells belonging to non-duplicable tasks which are allocated on the current clock cycle are thus reset. From the ports 3 and 0, numerical residues are received (the N values), as well as new BASE values. These values are fed back to section C of the RAM (Through the DIN lines), and thus the relevant PENDING and BASE fields are updated in the same clock cycle wherein they are read.

The vector masks (VM's included in the design constitute arrays of AND gates, wherein the masking bit enters all gates in parallel. A logic for resolving a minimum (also incorporated in the design) may be implemented using a selector which is controlled by a comparator. The illustrated design, which is uniform for all of the layers, is based on the assumption that any layer may perform allocations for any of the six ports. Actually not every combination is possible, due to the properties of the priority encoders. For example: If $VALID_4$="1" appears at the input to the pack preparation logic, then $VALID_5$="1" must also hold, and therefore layer 0 cannot allocate a task which appears on port 4. The specific design for each layer is obtained by a proper reduction of the uniform design, according to the following table of possible allocation combinations:

TABLE III

| | port 0 | port 1 | port 2 | port 3 | port 4 | port 5 |
|---|---|---|---|---|---|---|
| layer 0 | | | | | | |
| layer 1 | | | | | | |
| layer 2 | | | | | | |
| layer 3 | | | | | | |

The processor availability monitor unit consists of four totally disjoint compartments. Each compartment serves a particular external interface, and collaborates with the corresponding layer of the allocation pack preparation logic. During program run-time, the count of available processors (AVPROC) should be incremented by the number of porocessors reported to have disengaged (TOTAL_TERMINATIONS), and decremented by the number of allocated instantiations (N_INST), on every clock cycle.

The TPROC value, reflecting the total number of processors in the sub-tree governed by a compartment, is latched during initialization time. (As for the other parts of the CSU design, only the mechanism serving during run-time is detailed). The TPROC values (together with values fulfilling the same function at the distribution units) constitute the only configuration data in this design version, mk.

Allocation advances are implemented by submitting TPROC values which are higher than the actual amounts of processors.

The data arriving at the CSU through the CONCLUDED_TASK_ID. N_CONCLUDED_INST and T_COND, serve for performing updates in the RAM and/or stimulating connection matrix columns.

The role of the merge box is to unify termination packs pertaining to the same TASK_ID, and being received on the same clock cycle through distinct interfaces. The unification of termination packs is mandated by the structure of the mechanism for updating section C of the RAM, and in particular by the prohibition of multiple concurrent access to the same address. The dashed lines in the figure designate scalar signals, which can be viewed as having a control implication. The unit include adders, comparators, and vector masks. (Wherever several masking control bits enter the same mask, the masking condition is their AND function; some control inputs are inverting).

The post-merge termination packs are transmitted to the decode logic and update boxes. Suppose that on some (post-merge) interface k there appears a valid (N>0) termination pack, carrying the identification number ID=msb(ID); rest(ID).

If msb(ID)="1" (the task is non-duplicable), the output line having the index rest(ID) of the decoder belonging to interface k (one of the four decoders within the decoding logic) is stimulated. (See FIG. B11). The stimulation is routed via an OR gate to a connection matrix column. If the index ID designates a simple task, this is the only column belonging to task ID. Otherwise, (the index ID designates a conditioning task), this is the "$\phi$" column of task ID; in addition, either the "0" or the "1" column is stimulated, depending on the current logical value appearing on the line $T\_COND_k$.

If msb(ID)="0" (the task is duplicable), an access to the address rest(ID) at section C of the RAM takes place, via port k. The content which is read out is task ID's AWAITED field. The value N, which expresses a sum of terminated instantiations, is decremented from the read value, and the new value is stored on the same clock cycle. If the new AWAITED value is zero, which means that the task has terminated, a logical '0' will appear on the proper NZ(AWAITED) line on the next clock cycle. The synchronous differentiator which monitors this line will recognize the drop, and will stimulte the connection matrix column belonging to the task ID.

CONCLUSIONS

The synchronizer/scheduler architecture presented herein, which is framed in a general scheme according to which a dedicated hardware subsystem, directed by the program's dependency graph, manages synchronization, scheduling and work allocation in a multiprocessor - is attributed by the following properties:

The extended maximal flow-rate immanently matches the maximal sinking ability of the processors. Namely, it is practically unlimited.

The reduced maximal flow-rate amounts to at least several transactions per clock cycle. (Suppose, for example, that the fan-out of the CSU is four, and the average execution time of a task instantiation is 20 clock cycles. Then, during the execution of a task instantiation, instantiations pertaining to 80 distinct TASK_ID's can be allocated).

The enabling latency is logarithmic in the number of processors. The contribution of the CSU to the enabling latency is three clock cycles at most.

Approximate list scheduling (scheduling according to fixed task priorities) is supported.

Any synchronization/scheduling related overhead activity of the processors is eliminated.

When the program degree of parallelism sufficiently exceeds the number of processors, any synchronization/scheduling related overhead idling of the processors is also eliminated, due to allocation advances (provided that the reduced maximal flow-rate does not constitute a limitation).

Arbitrary patterns of parallelism are supported.

Allocations are global (any processor may receive any task instantiation), dynamic and performed on the basis of processors availability. Hence, optimal load balancing is accomplished.

The properties related with overheads and flow-rates furnish the necessary conditions for small and medium grain parallelism.

A solution to the synchronization efficiency problem in multiprocessors which relies on a specialized subsystem appears to lack the desired property of complete decentralization. Yet the following observation should be considered: Enabling of many execution threads by a single event is very frequency in parallel programs. Such a parallelism pattern typically results in a synchronization hot spot: a large portion of system activity is centered around a single resource for some duration. Memory hot spots associated with synchronization variables are just one example for this universal phenomenon. A synchronization hot spot signifies unintentional, occasional, de-facto centralization. Therefore, fixation of these hot spots at a pre-destined locus, where a powerful synchronization/scheduling engine can handle them efficiently, may prove to be a preferable solution.

It will be appreciated that as part of the architecture discussed, further work would include proposals for an optimal CSU design. Alternative design approaches, as well as suggestions for improving the current design, are also possible.

Having described the invention with regard to certain specific embodiments thereof, it is to be understood that the description is not meant as a limitation as further modifications may now suggest themselves to those skilled in the art and it is intended to cover such modifications as fall within the scope of the appended claims.

We claim:

1. A hardware synchronization/scheduling apparatus for performing synchronization/scheduling in a multiprocessor system by controlling, during program runtime, a process of monitoring and detecting which computational tasks are allowed for execution and allocating computational tasks to processors, the tasks being represented by instructions and data accessible to the processors via instruction and data storage hardware, said synchronization/scheduling apparatus comprising:

means for monitoring and detecting which computational tasks are allowed for execution, said monitoring/detecting means containing a task map describing the precedence relations among the computational tasks of the program, and communication/distribution means connected to said monitoring/detecting means, and to said processors for distributing, to the processors, information on computational tasks detected by said monitoring/detecting means to be allowed for execution in a processor and for forwarding, to said monitoring/detecting means, information on termination of execution of computational tasks at the processors, said communication/distribution means comprising a network of nodes possessing both the capability of decomposing information on a pack of allocated computational tasks into messages of finer partial packs of allocated computational tasks to be sent toward the processors and possessing the capability of unifying packs of information on termination of computational tasks into a more comprehensive pack, to be sent to said means for monitoring/detecting of allowed computational tasks.

2. The apparatus of claim 1 wherein said monitoring/detecting means comprises a connection matrix having a set of connections between rows and columns thereof, said set of connections representing said task map and being programmable, an enabling cell attached to said connection matrix detecting a specific computational task allowed for execution in a processor.

3. The apparatus of claim 1 wherein said communication/distribution means comprises a modular distribution network configured in modular fashion from a set of distribution units according to a desired configuration.

4. A method of performing synchronization/scheduling in a multiprocessor system by controlling, during run-time, a process of monitoring and detecting which computational tasks are allowed for execution and allocating computational tasks to processors, the tasks being represented by instructions and data accessible to the processors via instruction and data storage hardware, said method comprising the steps of:
monitoring and detecting which computational tasks are allowed for execution in accordance with a task map describing the precedence relations among the computational tasks of the program; and
distributing to the processors information on computational tasks detected in said monitoring and detecting step to be allowed for execution in a processor and forwarding information on termination of execution of computational tasks at the processors, said distributing step being performed in a network comprising nodes possessing both the capability of decomposing information on a pack of allocated computational tasks into messages of finer partial packs of allocated computational tasks to be sent toward the processors and possessing the capability of unifying packs of information on termination of computational tasks into a more comprehensive pack, provided in said monitoring and detecting step with respect to allowed computational tasks.

5. The method of claim 4 wherein said monitoring and detecting step is performed by a monitoring and detecting apparatus separate from said processors.

6. The method of claim 4 wherein global conditioning is performed based on termination conditions produced by the processors and transmitted via said network as part of said information on termination of computational tasks, without requiring conditioning computations or accessing of said data storage hardware during said monitoring and detecting step.

7. The method of claim 4, wherein a task of said task map embraces a multiplicity of instantiations, including terminated instantiations, the number of instantiations being controllable by the processors via direct access to registers maintained by said monitoring and detection apparatus.

8. The method of claim 4 wherein as part of said distributing step, forwarding information on termination of execution of computational tasks at the processors comprises separate forwarding of termination packs containing a quantity of terminated instantiations and forwarding of messages expressing quantities of processors which have entered a halted state.

9. The method of claim 4 wherein configuration data of said network is maintained in distributed fashion and processor employment data are also distributed.

10. The method of claim 4 wherein as part of said distributing step, decomposing information on a pack of allocated computational tasks into messages of finer partial packs of allocated computational tasks to be sent toward the processors is performed in an adaptive fashion, involving decisions local to a specific node of said network, based on processor availability, and using allocation advances through storage of allocation packs in said node.

* * * * *